US010430156B2

(12) United States Patent
Grobauer et al.

(10) Patent No.: US 10,430,156 B2
(45) Date of Patent: Oct. 1, 2019

(54) SYSTEM AND METHOD FOR ALLOWING USER INTERVENTION IN A SPEECH RECOGNITION PROCESS

(71) Applicant: Nuance Communications, Inc., Burlington, MA (US)

(72) Inventors: Gerhard Grobauer, Vienna (AT); Andreas Neubacher, Vienna (AT); Markus Vogel, Dusseldorf (DE); Miklos Papi, Budapest (HU)

(73) Assignee: Nuance Communications, Inc., Burlington, MA (US)

( * ) Notice: Subject to any disclaimer, the term of this patent is extended or adjusted under 35 U.S.C. 154(b) by 11 days.

(21) Appl. No.: 14/373,854

(22) PCT Filed: Jun. 27, 2014

(86) PCT No.: PCT/US2014/044672
§ 371 (c)(1),
(2) Date: Jul. 22, 2014

(87) PCT Pub. No.: WO2015/199731
PCT Pub. Date: Dec. 30, 2015

(65) Prior Publication Data
US 2015/0378671 A1    Dec. 31, 2015

(51) Int. Cl.
*G10L 15/00*    (2013.01)
*G10L 15/26*    (2006.01)
(Continued)

(52) U.S. Cl.
CPC ............ *G06F 3/167* (2013.01); *G10L 15/063* (2013.01); *G10L 15/22* (2013.01); *G10L 15/32* (2013.01);
(Continued)

(58) Field of Classification Search
CPC ......... G10L 15/22; G10L 15/30; G10L 15/26; G10L 15/265; G10L 15/32; G10L 2015/223; G10L 2015/221
(Continued)

(56) References Cited

U.S. PATENT DOCUMENTS 5,864,805 A  *  1/1999  Chen ...................... G10L 15/22
                                                    704/235
5,864,808 A  *  1/1999  Ando ..................... G06K 9/033
                                                    704/251

(Continued)

OTHER PUBLICATIONS

International Search Report and Written Opinion in related International Patent Application No. PCT/US2014/044672 dated Mar. 23, 2015 (9 pages).

*Primary Examiner* — Olujimi A Adesanya
(74) *Attorney, Agent, or Firm* — Brian J. Colandreo; Michael T. Abramson; Holland & Knight LLP (57)    ABSTRACT

A system and method for allowing user intervention in a speech recognition pipeline is presented. Embodiments may include receiving, at a computing device, a speech signal at a speech recognition engine, the speech signal being associated with an application. Embodiments may further include generating one or more suggested speech results at the speech recognition engine, the suggested speech results based upon, at least in part, the speech signal. Embodiments may also include displaying, at a graphical user interface associated with the computing device, the one or more suggested speech results prior to applying a final speech result. Embodiments may further include receiving a non voice-based selection of at least one of the one or more suggested speech results and applying the non voice-based selection to the application.

25 Claims, 8 Drawing Sheets

(51) Int. Cl.
*G10L 25/00* (2013.01)
*G10L 21/06* (2013.01)
*G06F 3/16* (2006.01)
*G10L 15/06* (2013.01)
*G10L 15/22* (2006.01)
*G10L 15/32* (2013.01)
*G10L 21/10* (2013.01)

(52) U.S. Cl.
CPC .............. *G10L 21/10* (2013.01); *G10L 15/26* (2013.01); *G10L 2015/0638* (2013.01); *G10L 2015/221* (2013.01); *G10L 2015/223* (2013.01); *G10L 2015/227* (2013.01)

(58) Field of Classification Search
USPC .............................. 704/235, 246, 270–275
See application file for complete search history.

(56) References Cited

U.S. PATENT DOCUMENTS

| | | | | |
|---|---|---|---|---|
| 5,909,667 | A * | 6/1999 | Leontiades | G06F 3/167 704/235 |
| 6,064,959 | A * | 5/2000 | Young | G10L 15/22 704/251 |
| 6,092,043 | A * | 7/2000 | Squires | G09B 19/04 704/251 |
| 6,138,098 | A * | 10/2000 | Shieber | G06F 17/271 704/257 |
| 6,347,300 | B1 * | 2/2002 | Minematsu | G10L 15/07 704/270 |
| 8,275,618 | B2 * | 9/2012 | Ganong, III | G10L 15/22 704/251 |
| 8,296,139 | B2 * | 10/2012 | Da Palma | G10L 15/30 369/25.01 |
| 2002/0163544 | A1 * | 11/2002 | Baker | G06F 3/04817 715/835 |
| 2003/0081739 | A1 * | 5/2003 | Hikishima | H04M 1/6058 379/88.01 |
| 2003/0212961 | A1 * | 11/2003 | Soin | G06F 3/04883 715/271 |
| 2007/0100635 | A1 | 5/2007 | Mahajan et al. | |
| 2008/0120102 | A1 * | 5/2008 | Rao | G10L 15/22 704/235 |
| 2008/0221898 | A1 * | 9/2008 | Cerra | G10L 15/30 704/270.1 |
| 2008/0255848 | A1 * | 10/2008 | Yu | G10L 15/265 704/270.1 |
| 2009/0112592 | A1 * | 4/2009 | Candelore | H04N 5/4403 704/246 |
| 2009/0228274 | A1 * | 9/2009 | Terrell, II | G10L 15/22 704/235 |
| 2009/0234647 | A1 * | 9/2009 | Scholz | G10L 15/30 704/235 |
| 2011/0054900 | A1 | 3/2011 | Phillips et al. | |
| 2011/0099157 | A1 * | 4/2011 | LeBeau | H04M 1/72533 707/706 |
| 2011/0313775 | A1 * | 12/2011 | Laligand | H04N 21/234336 704/275 |
| 2013/0046537 | A1 * | 2/2013 | Weeks | G10L 15/26 704/235 |
| 2013/0132079 | A1 * | 5/2013 | Sehgal | G10L 15/22 704/235 |
| 2015/0378522 | A1 * | 12/2015 | Butts | G06F 16/60 715/716 |

* cited by examiner

SYSTEM AND METHOD FOR ALLOWING USER INTERVENTION IN A SPEECH RECOGNITION PROCESS

RELATED APPLICATIONS

The subject application is a U.S. National Stage Application of International Application No. PCT/US2014/044672, filed on Jun. 27, 2014, the contents of which are herein incorporated by reference in its entirety.

TECHNICAL FIELD

This disclosure relates generally to a method for speech recognition, and more particularly, to a method for allowing user intervention in a speech recognition process prior to applying a result in a particular application.

BACKGROUND

Speech recognition ("SR"), or automatic speech recognition ("ASR"), involves a computerized process that identifies spoken words. There are many uses for speech recognition, including speech transcription, speech translation, ability to control devices and software applications by voice, call routing systems, voice search of the Internet, etc. Speech recognition systems can optionally be paired with spoken language understanding systems to extract meaning and/or commands to execute when interacting with systems.

Speech recognition systems are highly complex and operate by matching an acoustic signature of an utterance with acoustic signatures of words. This matching can optionally be in combination with a statistical language model. Thus, both acoustic modeling and language modeling are used in the speech recognition process. Acoustic models can be created from audio recordings of spoken utterances as well as associated transcriptions. The acoustic model then defines statistical representations of individual sounds for corresponding words. A speech recognition system uses the acoustic model to identify a sequence of sounds, while the speech recognition system uses the statistical language model to identify possible word sequences from the identified sounds.

Speech recognition providing voice-activated or voice command functionality enables speakers to control devices and systems by speaking various instructions. For example, a speaker can utter a command to execute a specific task or utter a query to retrieve specific results. Spoken input can follow a rigid set of phrases that perform specific tasks, or spoken input can be natural language, which is interpreted by a natural language unit of a speech recognition system. Voice command functionality is becoming increasingly popular on portable devices, especially battery-powered portable devices such as cell phones, laptops, and tablet computers.

Generally, a real-time/front-end speech recognition system works such that text results are inserted into an edit control and command results are executed. If there are recognition errors, applications may provide functionality to edit the text, select recognition alternatives from a list, and/or undo text changes or command effects. In other words, the recognition errors are first applied, and then corrected/remedied depending on application-provided functionality. This may be particularly problematic in case of applications that do not provide high usability in text editing (especially with respect to correction) and commands whose effects are not easily undone. Some prominent examples include misrecognition of a voice command as text or text as voice commands and confusion of different voice commands.

SUMMARY OF DISCLOSURE

In one implementation, a speech recognition method is provided. The method may include receiving, at a computing device, a speech signal at a speech recognition engine, the speech signal being associated with an application, the method may further include generating one or more suggested speech results at the speech recognition engine, the suggested speech results based upon, at least in part, the speech signal. The method may also include displaying, at a graphical user interface associated with the computing device, the one or more suggested speech results prior to applying a final speech result. The method may further include receiving a non voice-based selection of at least one of the one or more suggested speech results and applying the non voice-based selection to the application.

One or more of the following features may be included. In some embodiments, displaying may occur for a predefined period of time. A first result from the one or more suggested speech results may be automatically selected in the absence of user action. The method may further include enabling, via the graphical user interface, a deletion of at least one of the one or more suggested speech results. In some embodiments, receiving a non voice-based selection may include receiving an input from at least one of a mouse, a keyboard, a microphone and a foot control hardware mechanism. Receiving may include receiving the speech signal at a plurality of speech recognition engines configured to operate in parallel. The method may also include providing the received non voice-based selection to one or more training modules configured to execute a training algorithm. Receiving a selection may include receiving a selection of one or more of inserting text into a text control or a selection of a voice command for execution by the application. Generating the one or more suggested speech results may be performed by the speech recognition engine and the one or more suggested speech results include one or more formatting alternatives.

In another implementation, a non-transitory computer-readable storage medium is provided. The non-transitory computer-readable storage medium may have stored thereon instructions, which when executed by a processor result in one or more operations. The operations may include receiving, at a computing device, a speech signal at a speech recognition engine, the speech signal being associated with an application, the method may further include generating one or more suggested speech results at the speech recognition engine, the suggested speech results based upon, at least in part, the speech signal. Operations may also include displaying, at a graphical user interface associated with the computing device, the one or more suggested speech results prior to applying a final speech result. Operations may further include receiving a non voice-based selection of at least one of the one or more suggested speech results and applying the non voice-based selection to the application.

One or more of the following features may be included. In some embodiments, displaying may occur for a predefined period of time. A first result from the one or more suggested speech results may be automatically selected in the absence of user action. Operations may further include enabling, via the graphical user interface, a deletion of at least one of the one or more suggested speech results. In some embodiments, receiving a non voice-based selection may include receiving an input from at least one of a mouse, a keyboard, a microphone and a foot control hardware mechanism. Receiving may include receiving the speech signal at a plurality of speech recognition engines configured to operate in parallel. Operations may also include providing the received non voice-based selection to one or more training modules configured to execute a training algorithm. Receiving a selection may include receiving a selection of one or more of inserting text into a text control or a selection of a voice command for execution by the application. Generating the one or more suggested speech results may be performed by the speech recognition engine and the one or more suggested speech results include one or more formatting alternatives.

In another implementation, a system is provided. The system may include one or more processors configured to receive a speech signal at a speech recognition engine, the speech signal being associated with an application. The one or more processors may be further configured to generate one or more suggested speech results at the speech recognition engine, the suggested speech results based upon, at least in part, the speech signal. The one or more processors may be further configured to display, at a graphical user interface associated with the computing device, the one or more suggested speech results prior to applying a final speech result. The one or more processors may be further configured to receive a non voice-based selection of at least one of the one or more suggested speech results. The one or more processors may be configured to apply the non voice-based selection to the application.

One or more of the following features may be included. In some embodiments, a first result from the one or more suggested speech results is automatically selected in the absence of user action.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Embodiments provided herein are directed towards a system and method for allowing a user to intervene during a speech recognition process. As discussed above, a great deal of effort has been invested in the past towards providing high usability for undoing recognition errors that have already had an effect on an application state. However, all of these solutions suffer from restrictions due to their realization ex post facto. Embodiments of the SR intervention process 10 described herein may enable the user to interact with the recognition result before it is applied in an application. Accordingly, complex corrective action may be rendered unnecessary. In some embodiments, SR intervention process 10 may also be configured to use the information of the end user's choice to train the system.

Figure 1:
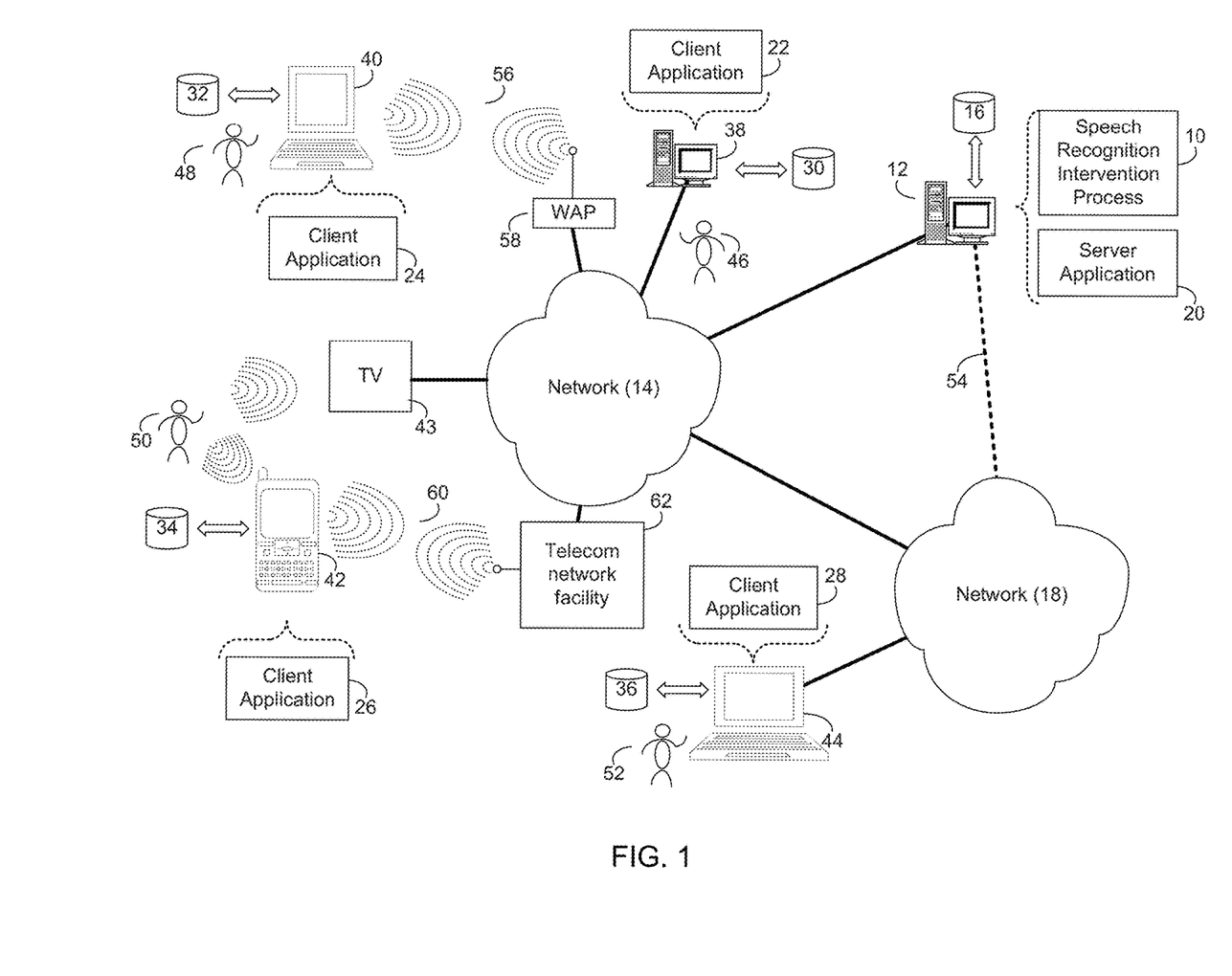
FIG. 1 is a diagrammatic view of an example of an SR intervention process in accordance with an embodiment of the present disclosure.
Figure 2:
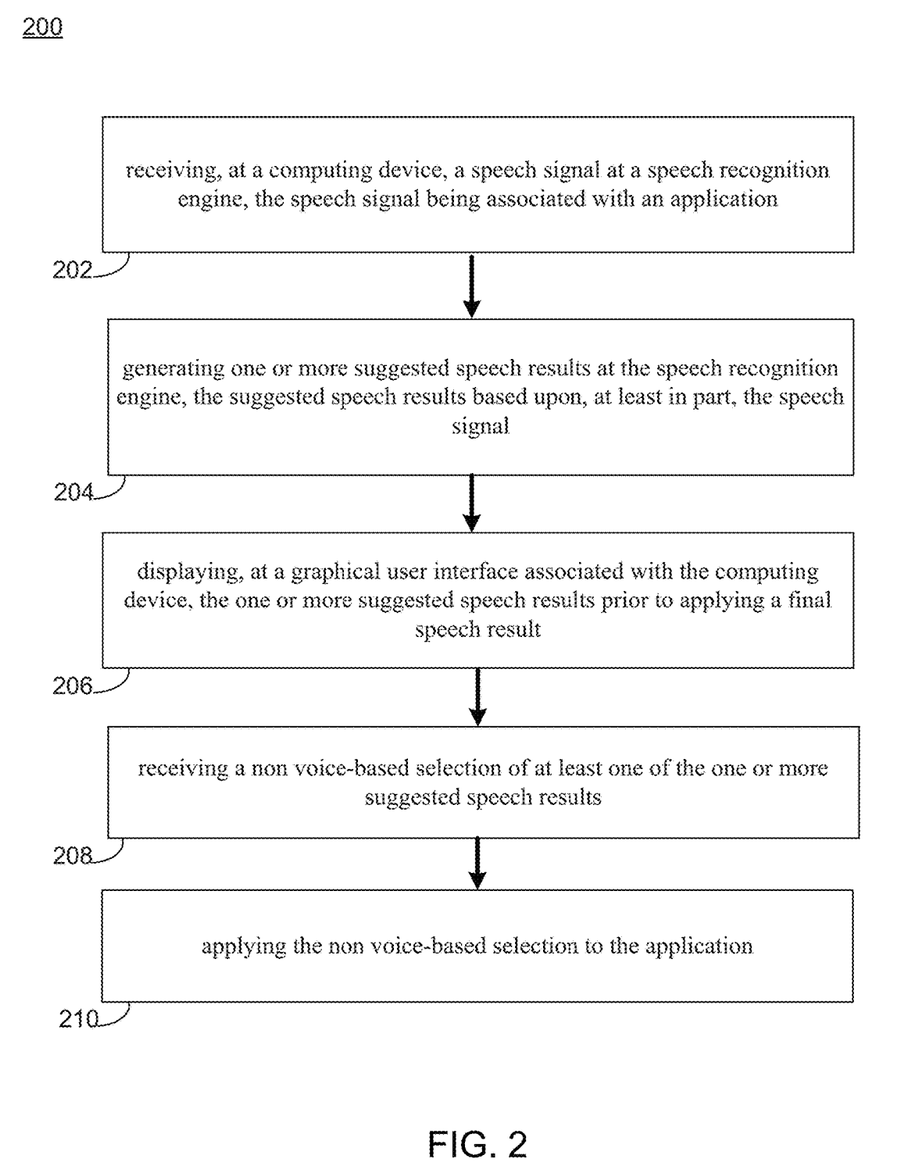
FIG. 2 is a flowchart of an SR intervention process in accordance with an embodiment of the present disclosure.

Referring to FIG. 1, there is shown a SR intervention process 10 that may reside on and may be executed by computer 12, which may be connected to network 14 (e.g., the Internet or a local area network). Server application 20 may include some or all of the elements of SR intervention process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-7, SR intervention process 10 may include receiving (202), at a computing device, a speech signal at a speech recognition engine, the speech signal being associated with an application. Embodiments may further include generating (204) one or more suggested speech results at the speech recognition engine, the suggested speech results based upon, at least in part, the speech signal. Embodiments may also include displaying (206), at a graphical user interface associated with the computing device, the one or more suggested speech results prior to applying a final speech result. Embodiments may further include receiving (208) a non voice-based selection of at least one of the one or more suggested speech results and applying (210) the non voice-based selection to the application.

The instruction sets and subroutines of SR intervention process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, SR intervention process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), a dedicated network device (not shown), an audio recording device, etc.

One or more of client applications 22, 24, 26, 28 may be configured to effectuate some or all of the functionality of SR intervention process 10. Accordingly, SR intervention process 10 may be a purely server-side application, a purely client-side application, or a hybrid server-side/client-side application that is cooperatively executed by one or more of client applications 22, 24, 26, 28 and SR intervention process 10.

Client electronic devices 38, 40, 42, 44 may each execute an operating system, examples of which may include but are not limited to Apple iOS™, Microsoft Windows™, Android™, Redhat Linux™, or a custom operating system. In some cases, the client electronic device may include audio recording functionality and/or may be an audio recording device. Additionally and/or alternatively, in some embodiments an audio recording device may be in communication with one or more of the client electronic devices as is discussed in further detail herein.

Users 46, 48, 50, 52 may access computer 12 and SR intervention process 10 directly through network 14 or through secondary network 18. Further, computer 12 may be connected to network 14 through secondary network 18, as illustrated with phantom link line 54. In some embodiments, users may access SR intervention process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14. In some embodiments, smartphone 42 may be an audio recording device or may include audio recording functionality and may enable an end user to record a speech signal. The speech signal may be stored and/or transmitted to any of the devices described herein. For example, transmitted over network 14 to client electronic device 40.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between any of the computing devices shown in FIG. 1 (e.g., between cellphone 42 and server computing device 12).

Figure 3:
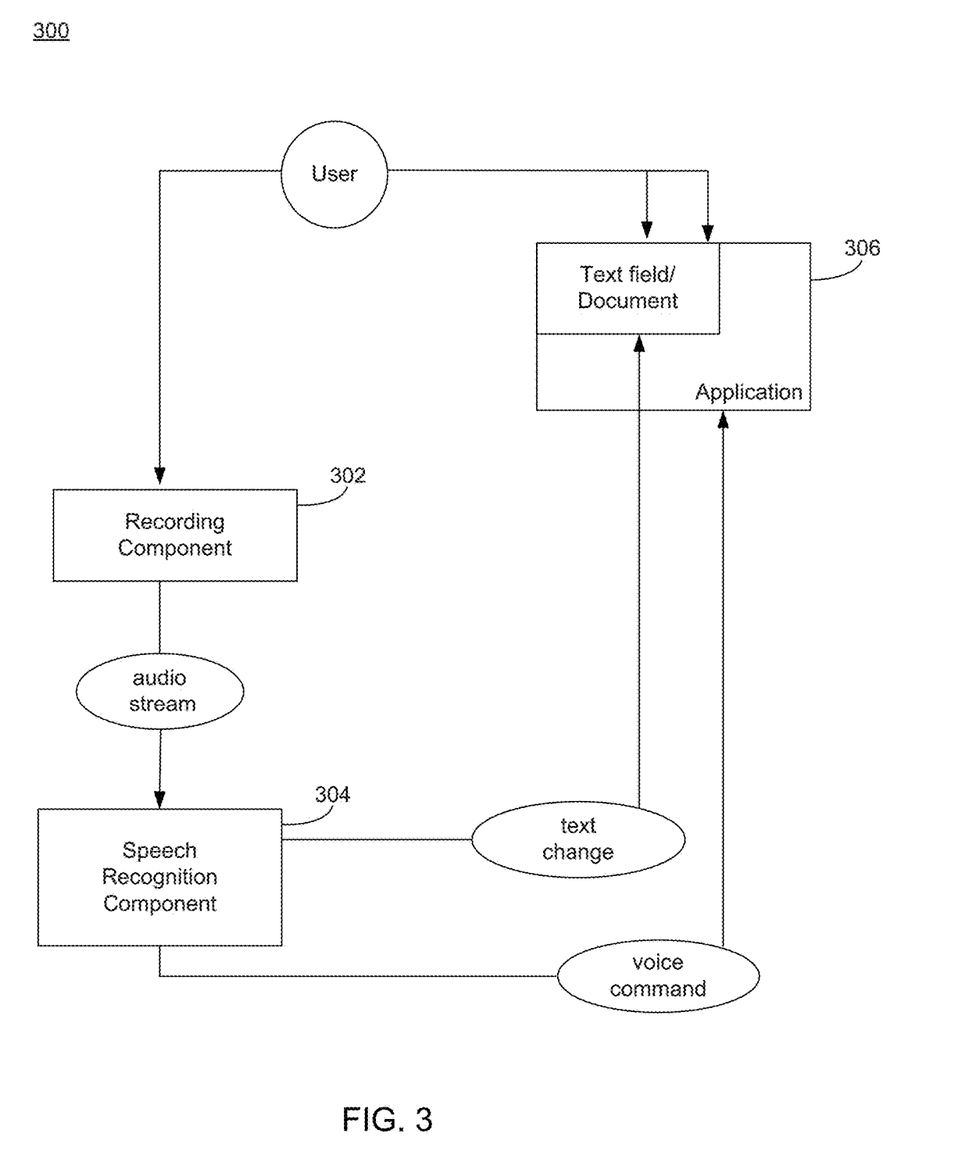
FIG. 3 is a diagrammatic view of an example of an SR workflow.

Referring now to FIG. 3, a diagram of a speech recognition workflow is provided. In operation, a user may speak utterances with the intention of adding text to a text field or document, or triggering functionality in the application equivalent to button clicks or menu item selection. Recording component 302 may be configured to capture any utterances from the user and forward them as an audio stream to the speech recognition component 304. Speech recognition component 304 may be configured to process the audio stream in real-time and create text change events (e.g., one or several words matching the utterance) and/or voice command events. In some embodiments, an application 306 may be configured to either apply the text change to the text field/document, and/or execute the voice command. The user may undo the text changes and/or voice command effects if they were not what was intended (e.g. caused by an error in the speech recognition process).

Figure 4:
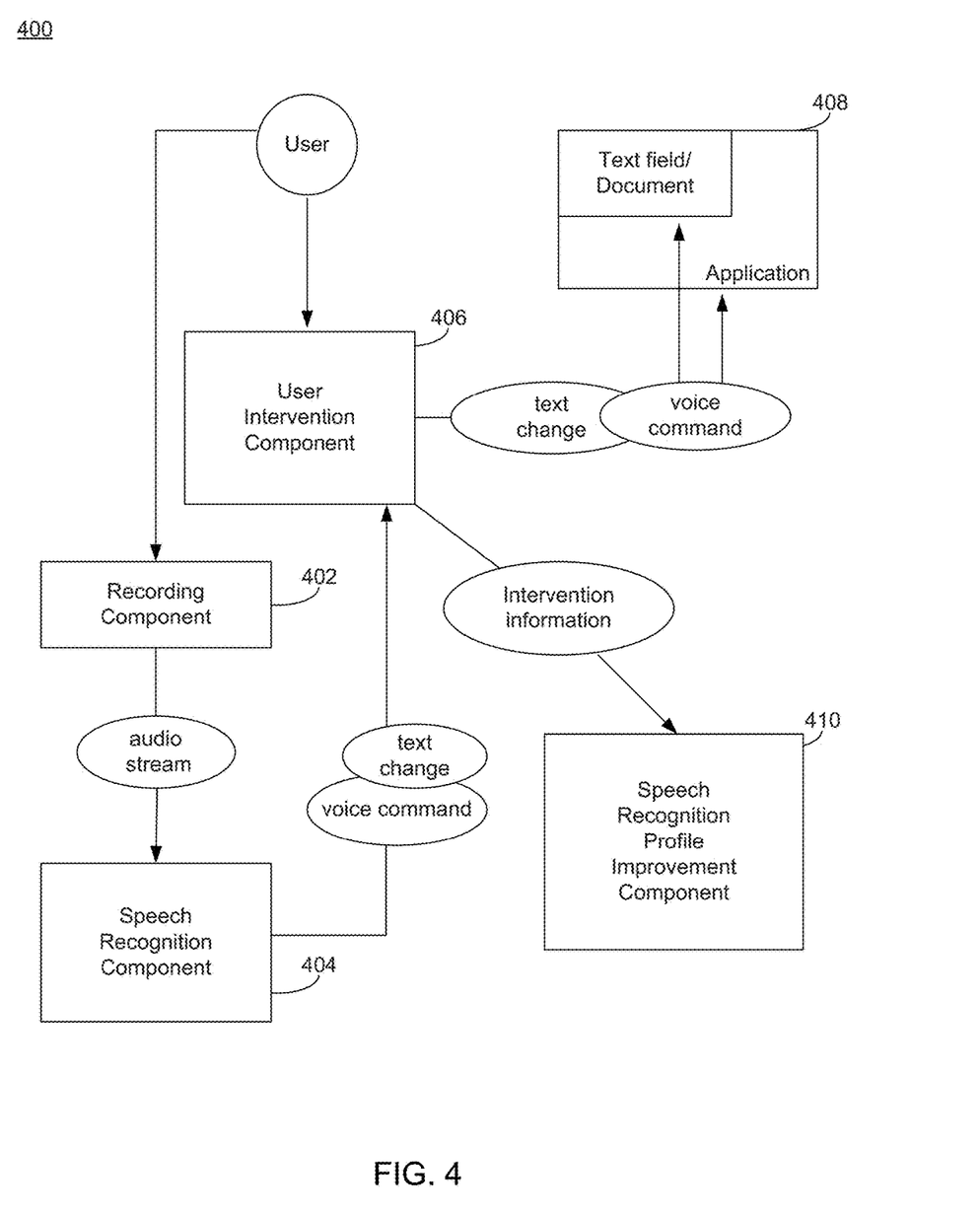
FIG. 4 is a diagrammatic view of an example of an SR intervention process in accordance with an embodiment of the present disclosure.

Referring now to FIG. 4, a diagram consistent with another embodiment of SR intervention process 10 is provided. In operation, a user may speak one or more utterances with the intention of adding text to a text field or document, or triggering functionality in the application equivalent to button clicks or menu item selection. Recording component 402 may be configured to capture utterances from the user and forward them as an audio stream to the speech recognition component 404. Speech recognition component 404 may be configured to process the audio stream in real-time and create text change events (e.g., one or several words matching the utterance) and/or voice command events. In either case, different alternative choices may be created (e.g., caused by ambiguities in the utterance). In some embodiments, user intervention component 406 may be configured to present the intended change (e.g., text, command) to the user. User intervention component 406 may also allow the user to cancel the change if it was caused by an error in the speech recognition process. This component may also allow the user to choose one of the alternative choices and then forward the explicitly chosen variant and/or any un-cancelled change to application 408, which may either apply the text change to the text field/document, and/or execute the voice command. Speech recognition profile improvement component 410 may be configured to receive information about the user choices and use this to apply one or more semi-supervised learning techniques.

Embodiments of SR intervention process 10 may include receiving, at a computing device, a speech signal at a speech recognition engine. As discussed above, the speech recognition engine may be associated with any of the devices shown in the Figures provided herein, either alone or in combination. For example, the SR engine may run partially or entirely on a client device, a server device, and/or any combination therebetween. The received speech signal may be associated with a particular application, for example, client application 26 associated with smartphone 42.

Embodiments of SR intervention process 10 may include generating one or more suggested speech results at the speech recognition engine, the suggested speech results based upon, at least in part, the speech signal. In turn, the generated suggested speech results may be displayed, at a graphical user interface associated with the computing device, in this example, smartphone 42. The one or more suggested speech signals may be displayed prior to applying a final speech result. Generating one or more suggested speech results may also be achieved by combining the speech results generated by a plurality of speech recognition engines into a common list of suggested speech results In some embodiments, after results (e.g., including recognition and formatting alternatives) have been returned by the speech recognition engine but before they are applied (e.g., either text inserted into a text control, and/or voice commands executed by the application) a graphical user interface ("GUI") element (e.g., a speech bubble, text box, etc.) may be displayed to the end user for a pre-defined period of time (e.g., a few seconds) that may be configured to allow the user to influence the chosen result. For example, some options may include, but are not limited to, allowing the user to select one of the alternatives, including selecting between execution of a voice commands and/or insertion of the written form into the current edit control, allowing the user to cancel/discard the result entirely, allowing the system to apply the top choice implicitly via inaction by user. In this way, a first result from the one or more suggested speech results may be automatically selected in the absence of user action. This and many of the other features of SR intervention process 10 may be user-configurable Embodiments of SR intervention process 10 may include receiving a non voice-based selection of at least one of the one or more suggested speech results and applying the non voice-based selection to the application. In some embodiments, using voice for making the choice in this GUI element may not be suitable (it may interrupt the "normal" recognition flow). Accordingly, some input modalities may include, but are not limited to, mouse, keyboard hotkeys, microphone and/or footcontrol hardware buttons. For example, microphones having custom programmable buttons configured to trigger various functions. One example may include, but is not limited to, the PowerMic brand available from the Assignee of the present disclosure. In this way, SR intervention process 10 may be configured to receive any suitable input.

In some embodiments of SR intervention process 10, receiving the speech signal may include receiving the speech signal at a plurality of speech recognition engines configured to operate in parallel. In this way, the user may have the option of selection between the results generated by differently configured recognition engines. For example, if a user is quickly switching between different medical specialties and non-medical vocabularies (e.g. in a form-filling scenario), instead of requiring the user to switch between vocabularies before starting to speak the audio may be processed by multiple recognizers in parallel and the alternative results may be presented to the user. As discussed above, this may occur prior to being applied to the edit control in the application. In some embodiments, SR intervention process 10 may allow for multiple text variants to be displayed on a portable device (e.g. smartphone 42), which may enable the user to make a selection prior to delivery to the desktop application such as client application 28 shown in FIG. 1. Accordingly, SR intervention process 10 may work in conjunction with a portable device that may be configured to provide a multimodal text input device for various computing devices over any computing network such as network 14 of FIG. 1.

Embodiments of SR intervention process 10 may include providing the received non voice-based selection to one or more training modules configured to execute a training algorithm. For example, implicit approval (e.g., no user activity) or explicit correction (e.g. user chooses one of the non-default alternatives) may be used as input to training algorithms that improve the speech recognition profile. This information may be particularly valuable for commands.

Figure 5:
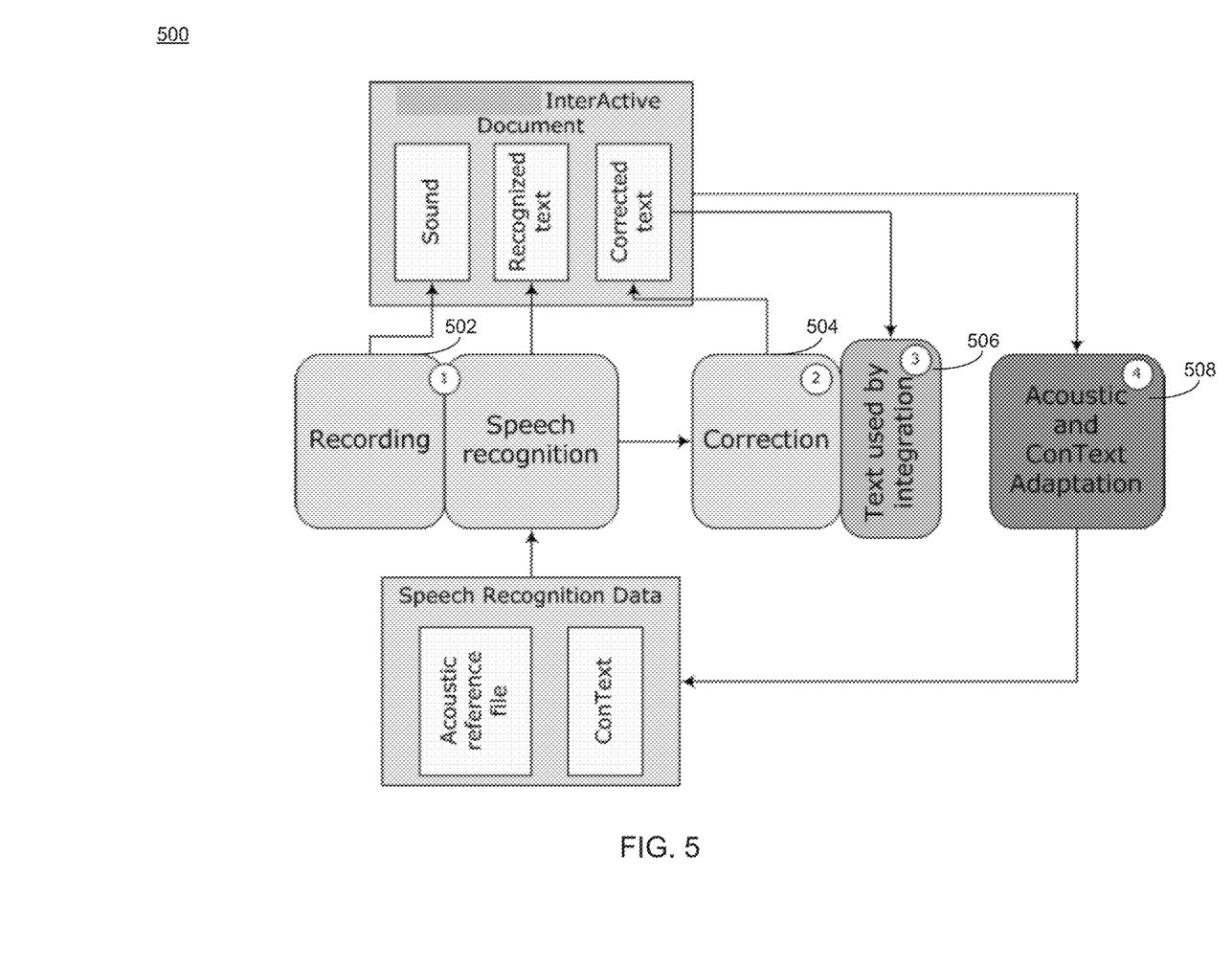
FIG. 5 is a diagrammatic view of an example of an SR intervention process in accordance with an embodiment of the present disclosure.

Referring now to FIG. 5, an embodiment of a frontend recognition system that may be used in accordance with SR intervention process 10 is provided. In operation, speech may be digitally recorded 502 and immediately fed into the speech recognition engine where it may be converted into recognition results (text and commands), using speech recognition data. The recognized text may be corrected 504, for example, by a correctionist, by the author, automatically, etc. Because the recognized text is usually corrected directly in the integration 506 it may be immediately available for further processing. The final InterActive document may be uploaded to the Backend and may be used as feedback in Acoustic Adaptation and ConText Adaptation module 508 to update the acoustic reference file and the vocabulary and language model (e.g., ConText).

Embodiments of SR intervention process 10 may be used in any suitable environment. In some embodiments, SR intervention process 10 may work in conjunction with various applications, such as those in the healthcare industry. Some of these may include, but are not limited to, SpeechMagic, Dragon Medical 360, and SpeechAnywhere systems available from the Assignee of the present disclosure.

Figure 6:
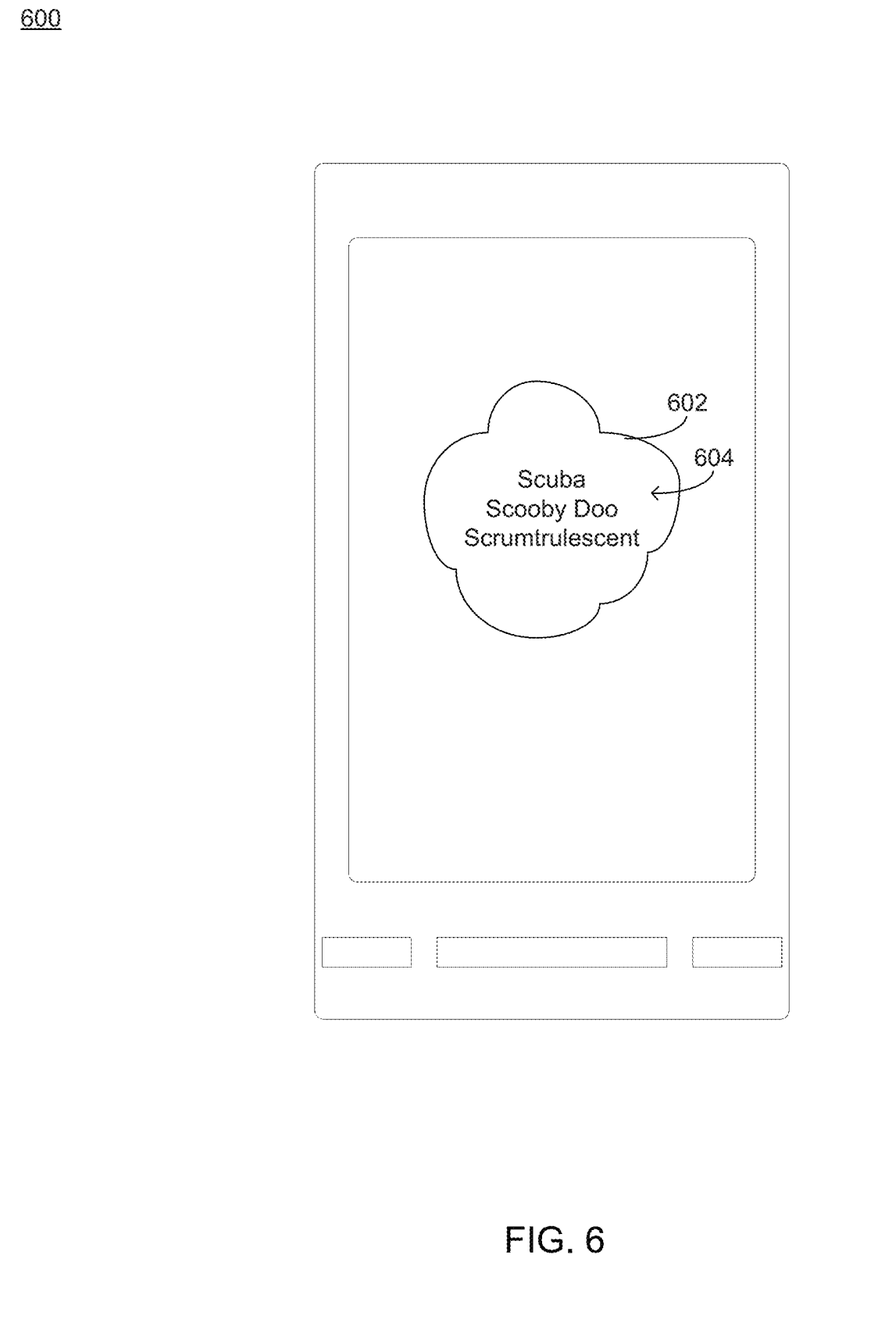
FIG. 6 is a diagrammatic view of an example of an SR intervention process in accordance with an embodiment of the present disclosure.

Referring now to FIG. 6, an embodiment depicting an example of a computing device that may be used to perform one or more of the operations associated with SR intervention process 10 is provided. This particular embodiment shows an example of a display 602 that may be provided to the user after the speech signal has been received and the suggested speech results 604 have been generated by the speech recognition engine. Accordingly, the one or more suggested speech signals may be provided prior to applying a final speech result. SR intervention process 10 may allow the user to select the most appropriate speech signal as discussed herein. For example, if the user were to select "scrumtrulescent" (e.g. by tapping display 602 or any other suitable approach), that selection would be received via SR intervention process 10 and that received selection may then be applied to the associated application (e.g. populated within a text field associated with the application, etc.). It should be noted that the particular arrangement and display shown in FIG. 6 is provided merely by way of example as any suitable display may be employed without departing from the scope of the present disclosure.

Figure 7:
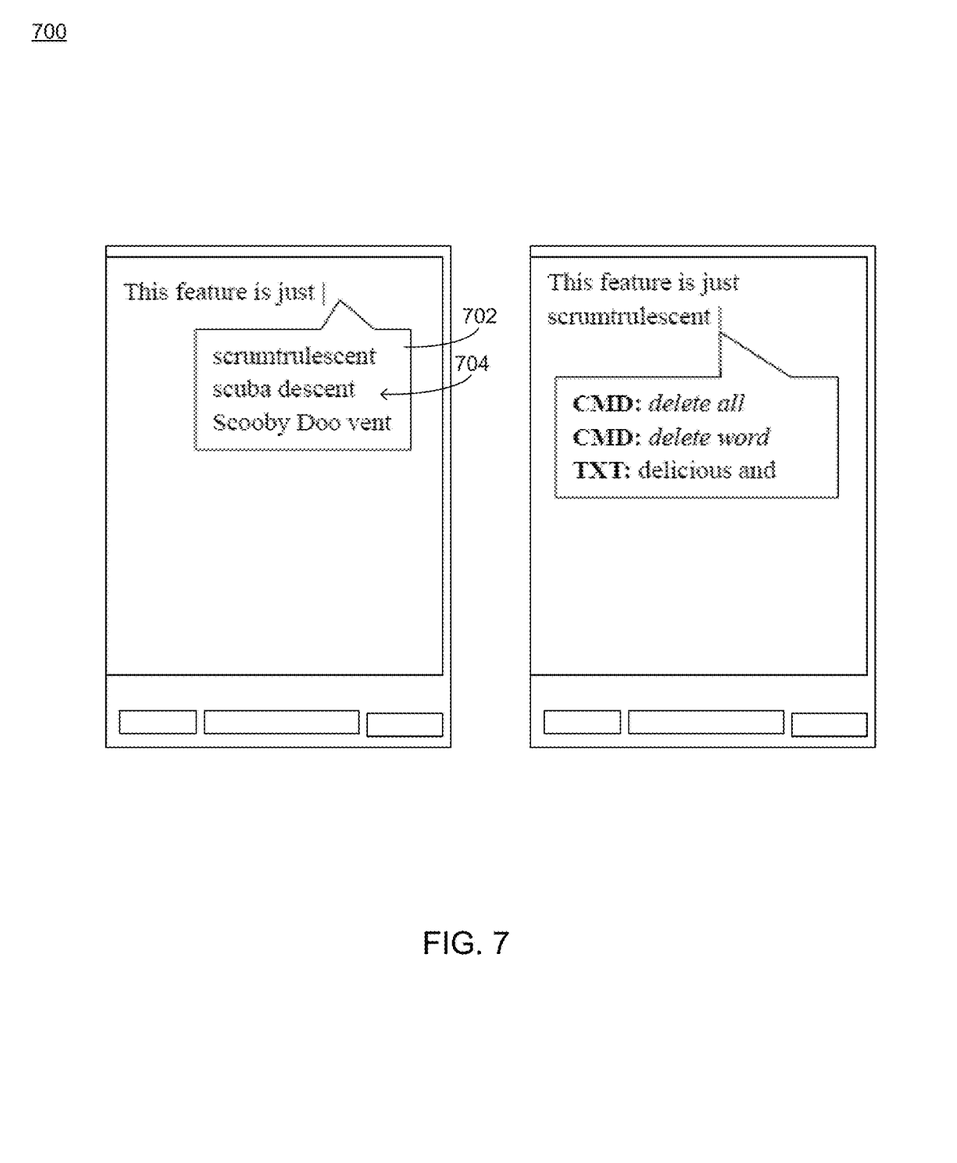
FIG. 7 is a diagrammatic view of an example of an SR intervention process in accordance with an embodiment of the present disclosure.

Referring also to FIG. 7, an embodiment depicting an example of a computing device that may be used to perform one or more of the operations associated with SR intervention process 10 is provided. This particular embodiment shows an example of a display 702 that may be provided to the user after the speech signal has been received and the suggested speech results 704 have been generated by the speech recognition engine. In some embodiments, the user may be continuously speaking and a number of result alternatives (e.g. 1-3, etc.) may be continuously being presented to the user. In some cases, and assuming a high recognition rate (e.g., approximately 95%), the user may not take any action and the top choice may be applied. If the user detects a misrecognition they may select an alternative or cancel the result entirely. As discussed above, any aspect of the SR intervention process described herein may be performed within, or in conjunction with, one or more devices of a network, such as those shown in FIG. 1. In this way, while the audio capture, choice GUI, and actual application GUI may be completely decoupled, in some cases, they may all reside on a single client device.

Figure 8:
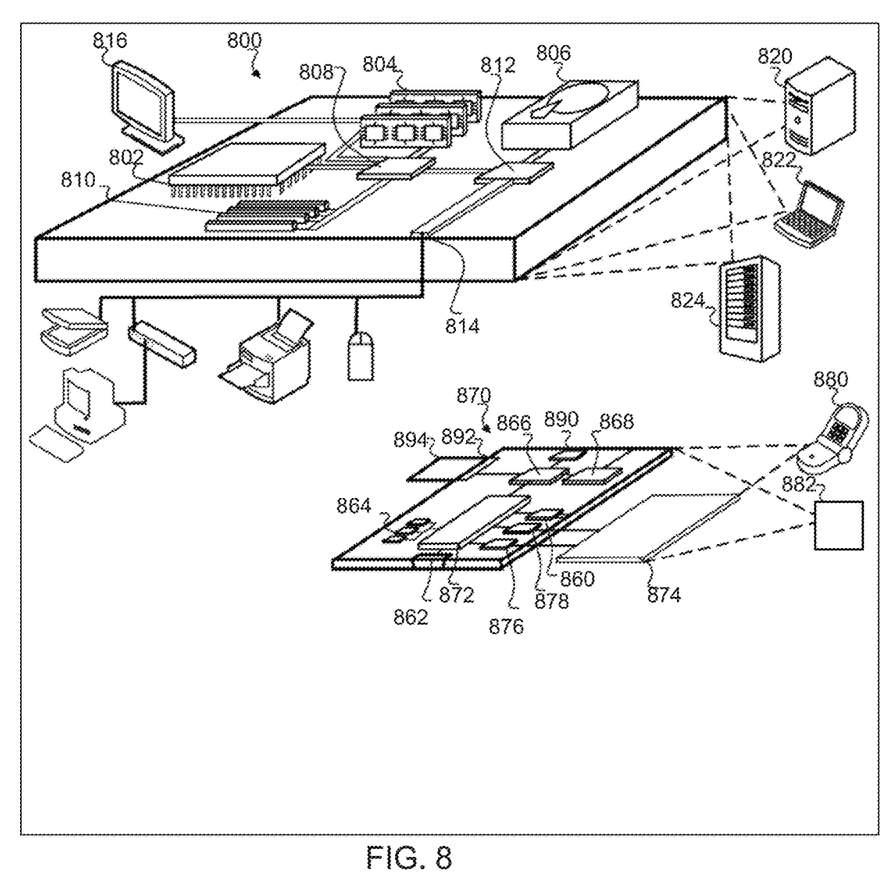
FIG. 8 shows an example of a computer device and a mobile computer device that can be used to implement the SR intervention process described herein.

Referring now to FIG. 8, an example of a generic computer device 800 and a generic mobile computer device 870, which may be used with the techniques described here is provided. Computing device 800 is intended to represent various forms of digital computers, such as tablet computers, laptops, desktops, workstations, personal digital assistants, servers, blade servers, mainframes, and other appropriate computers. In some embodiments, computing device 870 can include various forms of mobile devices, such as personal digital assistants, cellular telephones, smartphones, and other similar computing devices. Computing device 870 and/or computing device 800 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 800 may include processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, may be interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

Memory 804 may store information within the computing device 800. In one implementation, the memory 804 may be a volatile memory unit or units. In another implementation, the memory 804 may be a non-volatile memory unit or units. The memory 804 may also be another form of computer-readable medium, such as a magnetic or optical disk.

Storage device 806 may be capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

High speed controller 808 may manage bandwidth-intensive operations for the computing device 800, while the low speed controller 812 may manage lower bandwidth-intensive operations. Such allocation of functions is exemplary only. In one implementation, the high-speed controller 808 may be coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 870. Each of such devices may contain one or more of computing device 800, 870, and an entire system may be made up of multiple computing devices 800, 870 communicating with each other.

Computing device 870 may include a processor 872, memory 864, an input/output device such as a display 874, a communication interface 866, and a transceiver 868, among other components. The device 870 may also be provided with a storage device, such as a microdrive or other device, to provide additional storage. Each of the components 870, 872, 864, 874, 866, and 868, may be interconnected using various buses, and several of the components may be mounted on a common motherboard or in other manners as appropriate.

Processor 872 may execute instructions within the computing device 870, including instructions stored in the memory 864. The processor may be implemented as a chipset of chips that include separate and multiple analog and digital processors. The processor may provide, for example, for coordination of the other components of the device 870, such as control of user interfaces, applications run by device 870, and wireless communication by device 870.

In some embodiments, processor 872 may communicate with a user through control interface 878 and display interface 876 coupled to a display 874. The display 874 may be, for example, a TFT LCD (Thin-Film-Transistor Liquid Crystal Display) or an OLED (Organic Light Emitting Diode) display, or other appropriate display technology. The display interface 876 may comprise appropriate circuitry for driving the display 874 to present graphical and other information to a user. The control interface 878 may receive commands from a user and convert them for submission to the processor 872. In addition, an external interface 862 may be provide in communication with processor 872, so as to enable near area communication of device 870 with other devices. External interface 862 may provide, for example, for wired communication in some implementations, or for wireless communication in other implementations, and multiple interfaces may also be used.

In some embodiments, memory 864 may store information within the computing device 870. The memory 864 can be implemented as one or more of a computer-readable medium or media, a volatile memory unit or units, or a non-volatile memory unit or units. Expansion memory 874 may also be provided and connected to device 870 through expansion interface 872, which may include, for example, a SIMM (Single In Line Memory Module) card interface. Such expansion memory 874 may provide extra storage space for device 870, or may also store applications or other information for device 870. Specifically, expansion memory 874 may include instructions to carry out or supplement the processes described above, and may include secure information also. Thus, for example, expansion memory 874 may be provide as a security module for device 870, and may be programmed with instructions that permit secure use of device 870. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 864, expansion memory 874, memory on processor 872, or a propagated signal that may be received, for example, over transceiver 868 or external interface 862.

Device 870 may communicate wirelessly through communication interface 866, which may include digital signal processing circuitry where necessary. Communication interface 866 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 870, which may be used as appropriate by applications running on device 870.

Device 870 may also communicate audibly using audio codec 860, which may receive spoken information from a user and convert it to usable digital information. Audio codec 860 may likewise generate audible sound for a user, such as through a speaker, e.g., in a handset of device 870. Such sound may include sound from voice telephone calls, may include recorded sound (e.g., voice messages, music files, etc.) and may also include sound generated by applications operating on device 870.

Computing device 870 may be implemented in a number of different forms, as shown in the figure. For example, it may be implemented as a cellular telephone 880. It may also be implemented as part of a smartphone 882, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving, at a first computing device, a speech signal of a user, the speech signal being associated with an application;
   generating one or more suggested speech results at a speech recognition engine based upon, at least in part, the speech signal;
   displaying, at a first user interface associated with the first computing device, the one or more suggested speech results prior to applying a final speech result at a second user interface associated with the application on a second computing device, wherein the first user interface and the second user interface are on different computing devices;

allowing the user, at the first computing device, to select a suggested speech result of the one or more suggested speech results to yield the final speech result;

receiving the final speech result at the first user interface, wherein receiving the final speech result at the first user interface includes receiving at the first user interface a selection of an alternative choice between:

applying the final speech result at the second user interface by adding the final speech result to a text field of the second user interface associated with the application on the second computing device, and executing the final speech result as a voice command on the second user interface associated with the application on the second computing device; and forwarding, prior to applying the final speech result at the second user interface associated with the application on the second computing device, the selection to be applied to the application at the second user interface, wherein the final speech result triggers functionality in the application at the second user interface on the second computing device.

2. The method of claim 1, wherein displaying occurs for a pre-defined period of time.

3. The method of claim 1, wherein a first result from the one or more suggested speech results is automatically selected in the absence of user action.

4. The method of claim 1, further comprising: enabling, via the graphical user interface, a deletion of at least one of the one or more suggested speech results.

5. The method of claim 1, wherein receiving the selection includes receiving an input from at least one of a mouse, a keyboard, a microphone and a foot control hardware mechanism.

6. The method of claim 1, further comprising:
providing the selection to one or more training modules configured to execute a training algorithm.

7. The method of claim 1, wherein receiving the selection includes receiving a selection of one or more of inserting text into a text control and a selection of a voice command for execution by the application.

8. The method of claim 1, wherein the one or more suggested speech results include one or more formatting alternatives.

9. The method of claim 1, wherein displaying the one or more suggested speech results occurs at the first user interface for a pre-defined period of time, wherein the first user interface is a graphical user interface element.

10. The method of claim 9, wherein the graphical user interface element is a speech bubble.

11. The method of claim 1, wherein applying the selection to the application includes the final speech result.

12. The method of claim 1, wherein applying the selection to the application includes the final speech result, wherein the final speech result adds text to a text field at the second user interface associated with the application.

13. The method of claim 1, wherein the first user interface is displayed at a portable computing device and the second user interface is displayed at a desktop application.

14. The method of claim 1, wherein the application is a healthcare-based application.

15. The method of claim 1, wherein the voice-based command includes at least one of a delete all command and a delete word command.

16. A non-transitory computer-readable storage medium having stored thereon instructions, which when executed by a processor result in one or more operations, the operations comprising:

receiving, at a first computing device, a speech signal of a user, the speech signal being associated with an application;

generating one or more suggested speech results at a speech recognition engine based upon, at least in part, the speech signal;

displaying, at a first user interface associated with the first computing device, the one or more suggested speech results prior to applying a final speech result at a second user interface associated with the application on a second computing device, wherein the first user interface and the second user interface are on different computing devices;

allowing the user, at the first computing device, to select a suggested speech result of the one or more suggested speech results to yield the final speech result;

receiving the final speech result at the first user interface, wherein receiving the final speech result at the first user interface includes receiving at the first user interface a selection of an alternative choice between:

applying the final speech result at the second user interface by adding the final speech result to a text field of the second user interface associated with the application on the second computing device, and executing the final speech result as a voice command on the second user interface associated with the application on the second computing device; and forwarding, prior to applying the final speech result at the second user interface associated with the application on the second computing device, the selection to be applied to the application at the second user interface, wherein the final speech result triggers functionality in the application at the second user interface on the second computing device.

17. The non-transitory computer-readable storage medium of claim 16, wherein displaying occurs for a pre-defined period of time.

18. The non-transitory computer-readable storage medium of claim 16, wherein a first result from the one or more suggested speech results is automatically selected in the absence of user action.

19. The non-transitory computer-readable storage medium of claim 16, wherein the operations further comprise:
enabling, via the graphical user interface, a deletion of at least one of the one or more suggested speech results.

20. The non-transitory computer-readable storage medium of claim 16, wherein receiving the selection includes receiving an input from at least one of a mouse, a keyboard, a microphone and a foot control hardware mechanism.

21. The non-transitory computer-readable storage medium of claim 16, wherein the operations further comprise:
providing the selection to one or more training modules configured to execute a training algorithm.

22. The non-transitory computer-readable storage medium of claim 16, wherein receiving the selection includes receiving a selection of one or more of inserting text into a text control and a selection of a voice command for execution by the application.

23. The non-transitory computer-readable storage medium of claim 16, wherein the one or more suggested speech results include one or more formatting alternatives.

24. A system comprising:

one or more processors configured to receive a speech signal of a user, the speech signal being associated with an application, the one or more processors further configured to generate one or more suggested speech results at a speech recognition engine based upon, at least in part, the speech signal, the one or more processors further configured to display, at a first user interface associated with a first computing device, the one or more suggested speech results prior to applying a final speech result at a second user interface associated with the application on a second computing device, wherein the first user interface and the second user interface are on different computing devices, the one or more processors further configured to allow the user, at the first computing device, to select a suggested speech result of the one or more suggested speech results to yield the final speech result, the one or more processors further configured to receive the final speech result at the first user interface, wherein receiving the final speech result at the first user interface includes receiving at the first user interface a selection of an alternative choice between: (i) applying the final speech result at the second user interface by adding the final speech result to a text field of the second user interface associated with the application on the second computing device, and (ii) executing the final speech result as a voice command on the second user interface associated with the application on the second computing device, the one or more processors configured to forward, prior to applying the final speech result at the second user interface associated with the application on the second computing device, the selection to be applied to the application at the second user interface, wherein the final speech result triggers functionality in the application at the second user interface on the second computing device.

25. The system of claim 24, wherein a first result from the one or more suggested speech results is automatically selected in the absence of user action.

* * * * *